(12) United States Patent
Bhaumik et al.

(10) Patent No.: US 8,391,366 B2
(45) Date of Patent: Mar. 5, 2013

(54) MOTION ESTIMATION TECHNIQUE FOR DIGITAL VIDEO ENCODING APPLICATIONS

(75) Inventors: Sandip Bhaumik, Karnataka (IN); Murali Manohor, Karnataka (IN); Kummini Neelahandhan Manoj, Kerala (IN); Prakash Murigeena Harapanahalli, Karnataka (IN)

(73) Assignee: Sasken Communication Technologies Limited, Bangalore (IN)

( * ) Notice: Subject to any disclaimer, the term of this patent is extended or adjusted under 35 U.S.C. 154(b) by 374 days.

(21) Appl. No.: 12/731,930

(22) Filed: Mar. 25, 2010

(65) Prior Publication Data

US 2010/0177825 A1 Jul. 15, 2010

Related U.S. Application Data

(62) Division of application No. 10/202,236, filed on Jul. 24, 2002, now Pat. No. 7,801,215.

(60) Provisional application No. 60/307,539, filed on Jul. 24, 2001.

(51) Int. Cl.
*H04N 7/12* (2006.01)

(52) U.S. Cl. ............... 375/240.16; 375/240.12

(58) Field of Classification Search .................. 375/240, 375/240.01, 240.12, 240.16
See application file for complete search history.

(56) References Cited

U.S. PATENT DOCUMENTS

| | | | |
|---|---|---|---|
| 4,747,046 A | 5/1988 | Baum et al. | |
| 5,583,580 A | 12/1996 | Jung | |
| 5,731,850 A | 3/1998 | Maturi et al. | |
| 5,754,457 A | 5/1998 | Eitan et al. | |
| 5,757,668 A | 5/1998 | Zhu | |
| 5,815,670 A | 9/1998 | Iverson et al. | |
| 5,818,969 A | 10/1998 | Astle | |
| 6,195,389 B1 | 2/2001 | Roderiguez et al. | |
| 6,377,623 B1 | 4/2002 | Ra et al. | |
| 6,411,652 B1 | 6/2002 | Sivan | |

OTHER PUBLICATIONS

"U.S. Appl. No. 10/202,236, Response filed Oct. 12, 2009 to Non Final Office Action mailed Jun. 15, 2009", 20 pgs.
"U.S. Appl. No. 10/202,236, Final Office Action mailed Jan. 8, 2010", 09.
"U.S. Appl. No. 10/202,236, Non Final Office Action mailed Jun. 15, 2009", 12 pgs.
"U.S. Appl. No. 10/202,236, Non Final Office Action mailed Nov. 23, 2005", 6 pgs.
"U.S. Appl. No. 10/202,236, Response filed Mar. 9, 2010 to Final Office Action mailed Jan. 8, 2010", 19 pgs.
"U.S. Appl. No. 10/202,236, Response filed Oct. 20, 2005 to Restriction Requirement mailed Sep. 20, 2005", 20 pgs.
"U.S. Appl. No. 10/202,236, Response filed Aug. 24, 2006 to Non Final Office Action mailed Nov. 23, 2005", 19 pgs.
"U.S. Appl. No. 10/202,236, Restriction Requirement mailed Sep. 20, 2005", 6 pgs.
"U.S. Appl. No. 12/732,049, Non Final Office Action mailed Jul. 23, 2012", 7 pgs.

*Primary Examiner* — Allen Wong

(74) *Attorney, Agent, or Firm* — Schwegman, Lundberg & Woessner, P.A.

(57) ABSTRACT

The present invention provides an improved motion estimation encoder for digital video encoding applications. In one example embodiment, the improved encoder receives a raw image in the form of a current frame and estimates the macroblock motion vector with respect to a reference frame. The encoder then performs an initial local search around an initial motion vector candidate derived from spatio-temporal neighboring macroblock parameters. The encoder then compares the user-defined complexity scalable sum of absolute difference between the original and the associated reference macroblock against an adaptive threshold value for motion estimation convergence. The encoder introduces a global full search around a candidate from a coarser level, in case an initial local search fails. The encoder then selects an inter encoding mode for coding the current macroblock, when the first local search is successful, otherwise the encoder selects the inter or intra encoding mode for encoding the current macroblock by comparing variances of the original and difference macroblocks.

24 Claims, 4 Drawing Sheets

MOTION ESTIMATION TECHNIQUE FOR DIGITAL VIDEO ENCODING APPLICATIONS

PRIORITY INFORMATION

This application is a Divisional of U.S. application Ser. No. 10/202,236, which was filed on Jul. 24, 2002, and which issued as U.S. Pat. No. 7,801,205 on Sep. 21, 2010, and which claims priority to U.S. Provisional Application No. 60/307, 539, filed on Jul. 24, 2001, which applications are incorporated herein by reference in their entirety.

FIELD OF THE INVENTION

This invention generally relates to digital video encoding techniques, and more particularly to motion estimation techniques for digital video encoding applications.

BACKGROUND

In recent years, it has become increasingly desirable and practical to communicate digital video information—sequence of digital images—from one point to another. Indeed, transmission of video over computer networks, such as the World-Wide-Web portion of the Internet, from one computer to another is uncommon in digital television set-top boxes, DSS, HDTV decoders, DVD Players, Video Conferencing, Internet Video and other such applications. Since a single frame of video can consist of thousands or even hundreds of thousands of bits of information, it can take a considerable amount of time to transmit a sequence of frames from one point to another.

To reduce transmission costs, computers and other devices that transmit and receive digital video data generally include a video compression system. The video compression system typically includes an encoder for compressing digital video data from its raw form and a corresponding decoder at the receiver end for decompressing the compressed frame.

Video compression typically takes advantage of the redundancy within and between sequential frames of video data to reduce the amount of data ultimately needed to represent the sequence. The DPCM/DCT (Differential Pulse-Coded Modulation/Discrete Cosine Transform) hybrid coding technique has proved to be the most effective and successful for video compression. All current international standards, namely ITU H.261 and H.263, ISO MPEG I and II, have adopted this coding structure. In a hybrid video coder, prediction coding is used to reduce the temporal redundancy, and DCT is applied to the prediction error signal to eliminate the remaining spatial redundancy.

Motion estimation can be classified into two categories, namely the block-matching and pel-recursive (See H. G. Musmann, P. Hirsch, and H. J. Grallert, "Advances in picture coding," Proc. IEEE, pp. 523-548, April 1985, and M. Orchard, "A comparison of techniques for estimating block motion in image sequence coding," Proc. SPIE Visual Commun. and Image Processing, pp. 248-258, 1989). Because hybrid video coders are block-based and block-matching methods need much less complexity than pel-recursive to implement, only block matching has been considered for current practical video compression systems.

In hybrid coding, a video frame to be encoded is partitioned into non-overlapping rectangular, or most commonly, square blocks of pixels. The DCT domain operations are based on block sizes of 8×8 pixels. Motion compensation operates on macroblocks of 16×16 pixels. For each of these macroblocks, the best matching macroblock is searched from a reference frame in a predetermined search window according to a predetermined matching error criterion. Then the matched macroblock is used to predict the current macroblock, and the prediction error macroblock is further processed and transmitted to the decoder. The relative shifts in the horizontal and vertical directions of the reference macroblock with respect to the original macroblock are grouped and referred to as the motion vector of the original macroblock, which is also transmitted to the decoder. The main aim of motion estimation is to predict a macroblock such that the difference macroblock obtained from taking a difference of the reference and current macroblocks produces the lowest number of bits in DCT encoding.

The most straightforward method to search for the motion vector is the brute-force, global full-search (FS) method. In the FS method, all possible candidate locations in the search window are used to find the best match. Although this method can produce the best motion vector according to predetermined matching criterion, it is usually too complex to implement for real-time applications at a reasonable cost. To this end, various less complex methods have been proposed and studied to either reduce the complexity of evaluating the match error at each search location or to reduce the number of search locations, or both.

One of the most efficient current motion estimation techniques uses a two-stage approach. In the first stage a local search is made around a prospective candidate (see Junavit Chalidabhongse, C.C. Jay Kuo, "Fast Motion Vector Estimation using Multi-Resolution-Spatio-Temporal Correlations," IEEE Transaction on circuits and systems for video technology, Vol. 7, No 3, June 1997). The prospective candidate is chosen from the spatio-temporal neighborhood of the current macroblock (16×16 pixels). If the distortion measurement at any step is less than a predefined threshold, the corresponding motion vector is selected as the motion vector of the current macroblock. This local search method is allowed to operate for a predefined number of steps. If after all of these steps, no favorable motion vector is obtained, then an FS is executed with an origin around (0,0) motion vector. Unlike a local search, FS does not have any intermediate stopping criteria. It will calculate distortion measurement for all motion vectors in the search area and select the motion vector corresponding to the lowest distortion.

The problem with this approach is the selection of a reasonable fixed pre-defined threshold for stopping criteria during a local search for all macroblocks. If the selected predefined threshold is relatively high, the motion estimation search process can stop prematurely, selecting a non-optimal motion vector. This can result in generating a higher variance for the difference macroblock than the original and the encoder will be forced to do intra coding (Intra frames/blocks are coded without prediction information) for the current macroblock. This can lead to lower quality for Constant Bit Rate (CBR) encoding or it can result in a lower compression ratio for the Variable Bit Rate (VBR), if the selected predefined threshold value is relatively low. The local search process may not be able to satisfy the stopping criteria through an optimal or near optimal motion vector. This can again lead to selecting the motion vector through FS and this in turn can considerably increase search time. In reality, the threshold varies from one macroblock to the other. Therefore, choosing a fixed threshold can affect the quality of compression and encoder performance.

SUMMARY OF THE INVENTION

The present invention provides an improved motion estimation technique for digital video encoding applications. In one example embodiment, this is accomplished by using a computationally efficient encoder to compute frame-to-frame macroblock based motion vectors of digital images. The improved encoder receives a raw image in the form of a current frame. The encoder then performs an initial local search around an initial motion vector candidate derived from spatio-temporal neighboring macroblock parameters. The encoder then compares the user-defined complexity scalable sum of absolute difference between the original and associated reference macroblock against an adaptive threshold value for motion estimation convergence. In case an initial local search fails, a second search is then performed around a candidate from a coarser level by the encoder. The encoder then selects an inter encoding mode for coding the current macroblock, when the first local search is successful. Otherwise the encoder selects the inter or intra encoding mode for encoding the current macroblock by comparing variances of original and difference macroblocks.

Other aspects of the invention will be apparent on reading the following detailed description of the invention and viewing the drawings that form a part thereof.

DETAILED DESCRIPTION

The present invention provides an efficient digital video compression technique that enhances encoder performance without compromising the quality of the compression during motion estimation. Also, the technique enhances encoder performance without increasing the search time for a motion vector. In one embodiment, this is accomplished by providing a computationally efficient processing technique to compute a frame-to-frame macroblock based motion vectors of digital images. The improved encoder receives a raw image in the form of a current frame. The encoder then performs an initial local search around an initial motion vector candidate derived from spatio-temporal neighboring macroblock parameters. The encoder then compares the user-defined complexity scalable sum of absolute difference between the original and the associated reference macroblock against an adaptive threshold value for motion estimation convergence. If the initial local search fails, the encoder then introduces a global full search around a candidate from a coarser level. The encoder then selects inter mode encoding when the first local search is successful. Otherwise the encoder selects inter or intra encoding mode by comparing variances of the original and the difference macroblock.

Figure 1:
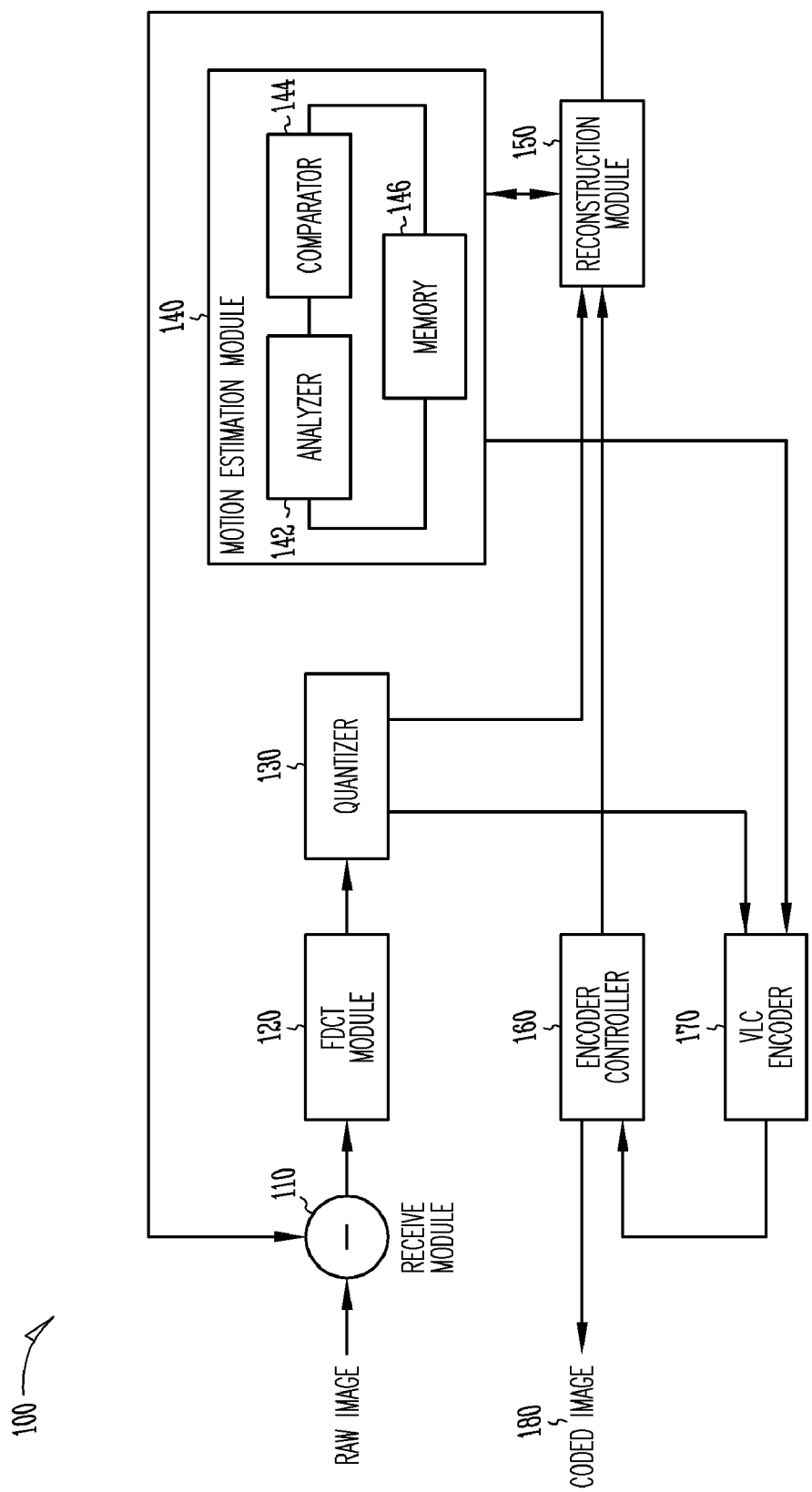
FIG. 1 is a block diagram illustrating the major modules of the video encoder structure of the present invention.

FIG. 1 is a block diagram illustrating major modules of the video encoder structure 100 of the present invention. Shown in FIG. 1 are a receive module 110, an FDCT module 120 coupled to the receive module 110, a quantizer 130 coupled to the FDCT module 120, a motion estimation module 140 coupled to the receive module 110, a reconstruction module 150 coupled to the motion estimation module 140, a VLC encoder 170 coupled to the quantizer 130, and an encoder controller 160 coupled to the VLC encoder 170 and the reconstruction module 150. In addition, quantizer 130 is coupled to reconstruction module 150. The motion estimation module 140 further includes an analyzer 142, a comparator 144, and a memory 146.

In operation, the receive module 110 receives raw images in the form of current frames in YUV format. Y stands for luminance and U and V (U, V) stand for chrominance. Receive module 110 also receives associated encoding parameters and prediction information, such as intra or inter coding for coding the frames. Receive module 110 then makes corrections using the received prediction information to the received current frame when encoded as an inter frame. Motion estimation module 140 is used only when the received current frame is coded as inter frame. Motion estimation is performed on macroblocks. In an intra frame, all macroblocks are coded as intra, but in an inter frame, macroblocks may be coded as intra and inter. The macroblock coding mode is selected using a motion estimation output.

When the receive module 110 receives a current frame to be coded as an intra frame, the FDCT (Forward Discrete Cosine Transformation) module 120 transforms the current frame to frequency domain information. In some embodiments, FDCT module 120 transforms the current frame to frequency domain information by partitioning the received current frame into blocks of 8×8 pixels and performs a discrete cosine transformation on all chrominance and luminance blocks of the current frame to form DCT coefficients. The discrete cosine transformation (DCT) operation does a spatial-to-frequency transformation of the raw current frame to produce DCT coefficients for each block.

Quantizer 130 then quantizes the produced DCT coefficients in each block using a quantization parameter, calculated by rate, control along with quantization matrix given by the Video Encoder Standard. The quantization operation reduces the dynamic range of the DCT coefficients in each block. This operation generally includes dividing the DCT coefficients by a quantizer value. During decoding, an inverse operation is performed (and also in the reconstruction module 150 of the encoder 100) on the quantized DCT coefficients by multiplying the quantized DCT coefficients with the same quantizer value used in dividing the DCT coefficients during the encoding operation. Quantizer 130 then performs rounding operations on the quantized DCT coefficients.

In some embodiments, quantizer 130 divides the DCT coefficients in each of the blocks by a quantization parameter to reduce the dynamic range of the transformed frequency domain information. Quantizer 130 then rounds of the quantized DCT coefficients.

VLC encoder 170 then codes the quantized DCT coefficients using standard specified variable length codes. These codes are generally generated using huffman coding concepts. In huffman coding, the highest number of bits is allocated to the rare combination and the smallest number of bits are allocated to the most probable combination. Here 'combination' means a symbol composed of the run and level of quantized DCT coefficients of a block. The 'level' means the absolute value of the quantized DCT coefficient and the 'run' means the number of zero elements present between the current non-zero quantized DCT coefficient and the previous non-zero coefficient traversed in a particular scanning order. Generally, a signal is included at the end of each block to indicate the end of the block.

In some embodiments, VLC 170 encoder receives the quantized frequency domain information of the current macroblock along with associated motion vector information and reduces the number of bits required to represent the received information using a non-adaptive entropy code book. The non-adaptive entropy code book includes a distribution of least number of bits for most probable cases and more number of bits for the least probable cases. VLC encoder 170 further generates a variable length code for motion vector for inter macroblock using a motion vector code table.

The encoder controller 160 then arranges the variable length coded DCT coefficients in a particular way with an appropriate header as specified in the Standard. The encoder controller 160 then outputs a coded stream of images 180. In some embodiments, encoder controller 160 receives the reduced number of bits representing the current macroblock from the VLC encoder and adds packetization information and outputs an encoded current frame.

Reconstruction module 150 receives quantized DCT coefficients from quantizer 130 and reconstructs each block by inverse quantized QDCT (quantized DCT) coefficients and by inverse DCT transforming the inverse quantized QDCT coefficients. The reconstructed DCT coefficients are then used by receive module 110 for making corrections to the current frame encoded as an inter frame.

In some embodiments, reconstruction module 150 receives the quantised current frame and associated initial distortion and computes a difference frame. Reconstruction module 150 then computes a motion compensation frame using the selected initial motion vector and a previous reference frame and reconstructs the current frame by adding the difference frame and the computed motion compensation frame.

When receive module 110 receives the current frame to be encoded as an inter frame, motion estimation module 140 performs motion estimation using the current frame and a reconstructed reference frame. The reconstructed reference frame is generally the reconstructed previous frame received from reconstruction module 150. Motion estimation is done on blocks of 16×16 pixels, known as 'macroblocks.'

During motion estimation, receive module 110 receives a raw image in the form of a current frame and its associated encoding parameters. Receive module 110 makes corrections by subtracting prediction information from the received current frame when encoded as an inter frame. In some embodiments, analyzer 142 searches a macroblock region in the reference frame for the closest match to an associated macroblock region in the current frame. Then FDCT module 120 receives the corrected current macroblock and transforms the current macroblock to frequency domain information. In some embodiments, frequency domain information transformation includes spatial-to-frequency transformation for compression of image data. In some embodiments, FDCT module 120 transforms the spatial domain information by partitioning the received correct current frame into blocks of 8×8 pixels and then performs DCT transformation on each of the partitioned blocks to form DCT coefficients. In some embodiments, DCT coefficients include spatial-to-frequency transformation information.

Then quantizer 130 reduces the dynamic range of the transformed frequency domain information of the current frame by using a quantization value or parameter. In some embodiments, quantizer 130 divides the DCT coefficients in each of the blocks by a quantization value to reduce the transformed frequency domain information.

During motion estimation, analyzer 142 partitions the quantized current frame into non-overlapping rectangular macroblocks. In addition, analyzer 142 computes a motion estimation termination threshold for a current macroblock in the current frame using the current macroblock's parameters. Further, analyzer 142 selects an initial motion vector by using spatio-temporal neighboring macroblock parameters. In some embodiments, analyzer 142 computes the motion vector by determining a relative position of the matched macroblock in the reference frame with respect to the current macroblock. For example, if the motion vector is (0,0) (zero in both horizontal and vertical directions), then the matched macroblock is the co-located macroblock in reconstructed reference frame. Analyzer 142 then determines an initial distortion for the current macroblock by computing a sum of absolute difference using the computed initial motion vector and an associated reference macroblock.

Then comparator 144 compares the computed initial distortion to the computed motion estimation termination threshold. Then analyzer 142 either terminates or continues the motion estimation process based on the outcome of the comparison.

In some embodiments, analyzer 142 selects inter coding for encoding the current macroblock when the computed initial distortion is less than the computed motion estimation termination threshold. In some embodiments, analyzer 142 computes the sum of absolute difference values at each of the equidistant motion vector positions from the initial motion vector when the computed initial distortion is greater than or equal to the computed motion estimation termination threshold. In addition in this embodiment, analyzer 142 determines a minimum sum of absolute difference value from the computed sum of absolute difference values. Then the comparator 144 compares the determined minimum sum of absolute difference value to the motion estimation termination threshold and selects an encoding mode based on the outcome of the comparison by comparator 144.

In some embodiments, analyzer 142 selects an inter coding mode for encoding the current macroblock when the determined minimum sum of absolute difference value is less than the motion estimation termination threshold. In other embodiments, when the determined minimum sum of absolute difference value is greater than or equal to the motion estimation termination threshold, analyzer 142 repeats the computation of the sum of absolute difference values in the next levels of equi-distant motion vectors for a predetermined number of times. When the determined minimum sum of absolute difference value obtained after repeating the above search for the predetermined number of times does not yield a value less than the motion estimation termination threshold, analyzer 142 performs a global full search to encode the current macroblock.

Then VLC encoder 170 receives the quantized frequency domain information of the current frame, along with associated motion vector information, and reduces the number of bits required to represent this information using a look-up table (non-adaptive entropy code book). This is based on using the least number of bits for the most probable cases and a larger number of bits for the least probable cases. Further, VLC encoder 170 generates variable length code for the motion vector for inter macroblock using the look-up table. Reconstruction module 150 receives quantized coefficients of each macroblock and associated motion compensation information and generates a reconstructed current frame by adding a difference frame and a motion compensated frame. The difference frame is computed using the quantized coefficients and motion compensation information and further the motion compensated frame is computed using motion vector information and a previous reference frame. Encoder controller 160 then receives the reduced number of bits representing the current frame from VLC encoder 170 and adds packetization information, and outputs an encoded current frame. In some embodiments, memory 146 stores non-adaptive entropy codebook information and any previously reconstructed frame information.

Figure 2:
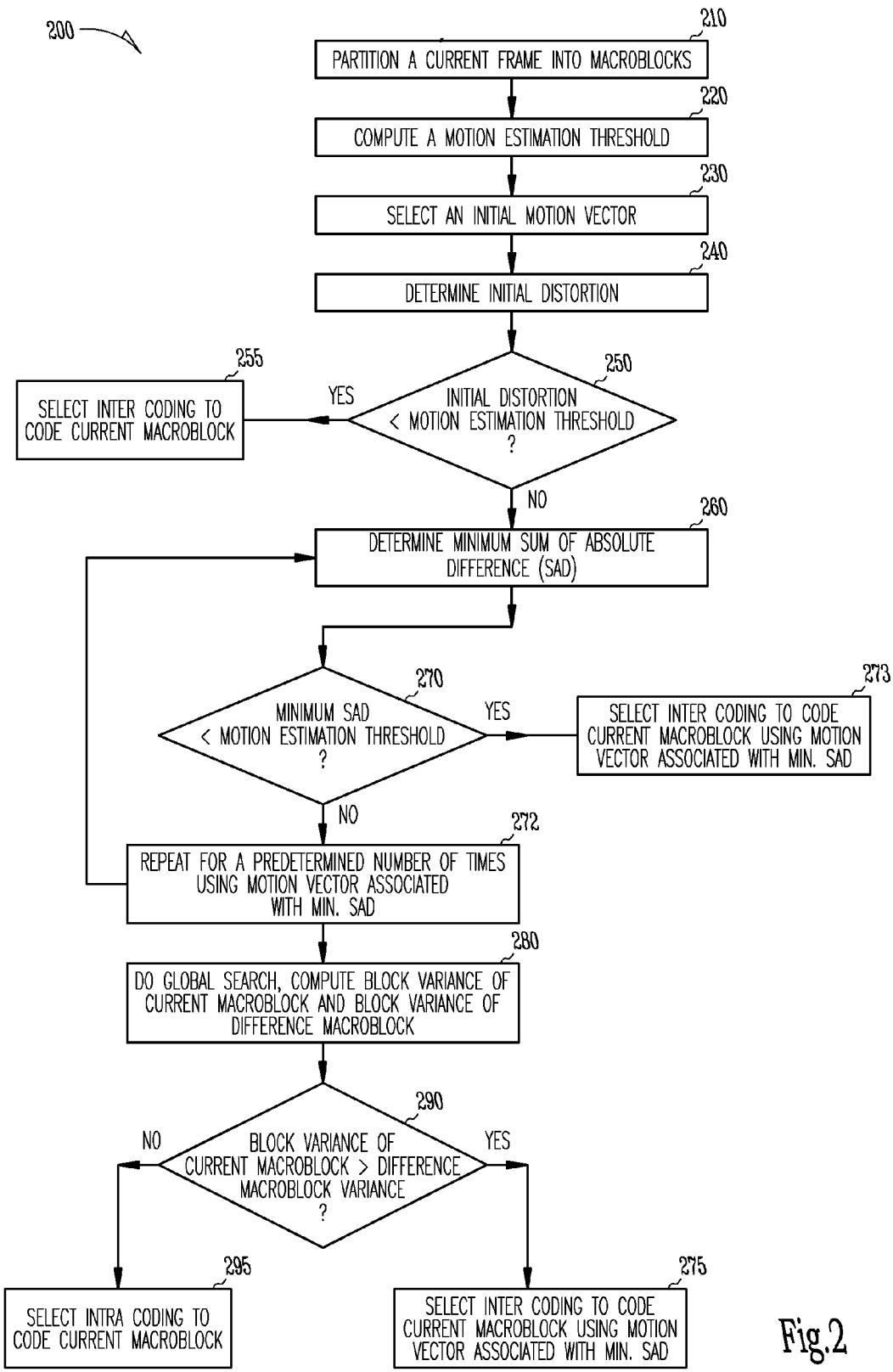
FIG. 2 is a flowchart illustrating the operation of the digital video compression of the present invention.

FIG. 2 is a flowchart illustrating one example embodiment of a process 200 of frame-to-frame digital video encoding by estimating a motion vector of a digital image macroblock. The flowchart includes steps 210-295, which are arranged serially in the exemplary embodiment. However, other embodiments of the invention may execute two or more steps in parallel using multiple processors or a single processor organized as two or more virtual machines or subprocessors. Moreover, still other embodiments implement the steps as two or more specific interconnected hardware modules with related control and data signals communicated between and through the modules, or as portions of an application-specific integrated circuit. Thus, the exemplary process flow is applicable to software, firmware, and hardware implementations.

The process begins with step 210 by partitioning a received current frame into non-overlapping macroblocks. A single frame of video can consist of thousands or even hundreds of thousands of bits of data. Macroblocks are based on square blocks including a luminance component of 16×16 pixels in size. Each macroblock has associated two chrominance blocks of 8×8 pixels in size. But motion estimation is done only on the luminance component. Motion vectors of chrominance components are derived from luminance motion vectors.

Step 220 includes computing a motion estimation termination threshold for the current macroblock using macroblock parameters. In some embodiments, the motion estimation termination threshold for the current macroblock is computed using the equation:

$$sqrt\left(\sum_{I=0}^{255}(x_I-\mu)^2 + 2*255*128*(x_{avg})^2\right)$$

wherein $x_I$'s are luminance components of the current macroblock, $x_{avg}$ is the allowed average absolute pixel-difference for an optimal prediction, and $\mu$ is the mean of $x_I$ where I=0 to 255.

Step 230 includes selecting an initial motion vector for the current macroblock using spatio-temporal macroblock parameters. In some embodiments, initial motion vector is selected by selecting candidate spatio-temporal neighboring macroblocks having computed motion vector. Then selecting the initial motion vector for the current macroblock from the selected candidate macroblocks based on a predetermined voting technique. Predetermined voting technique is based on initially getting a value close to the associated reference macroblock.

Step 240 includes determining the initial distortion for the current macroblock by computing a sum of absolute difference, also referred to as an initial distortion measure, using the selected initial motion vector and associated reference macroblocks. In some embodiments, the sum of absolute difference between the current macroblock and the associated reference macroblock is computed using the equation:

$$\sum_{I=0}^{255}|x_I-y_I|$$

wherein $x_I$'s are the luminance components of the current macroblock and $y_I$'s are luminance components of the reference macroblock.

Step 250 includes comparing the computed initial distortion to the computed motion estimation termination threshold. Step 255 then, encodes using the inter coding mode and the selected initial motion vector is chosen as the representative motion vector for the current macroblock, when the computed initial distortion is less than the computed motion estimation termination threshold. Encoding using inter coding means encoding the current macroblock by using the computed motion vector information of the current macroblock, along with QDCT.

When the computed initial distortion is greater than or equal to the computed motion estimation termination threshold, step 260 includes computing the sum of absolute difference values at each of the equidistant motion vector positions from the initial motion vector, and further includes determining a minimum sum of absolute difference value using the computed sum of absolute difference values. In some embodiments, if the initial motion vector is (u, v), then the sum of absolute difference values is computed for equidistant positions at {(u−1,v−1), (u−1, v), (u−1, v+1), (u, v−1), (u, v+1), (u+1, v−1), (u+1, v), (u+1, v+1)}.

Step 270 includes comparing the determined minimum sum of absolute difference value to the computed motion estimation termination threshold. When the determined minimum sum of absolute difference value is less than the motion estimation termination threshold, step 273 encodes the current macroblock using the inter coding mode and the motion vector associated with the minimum sum of absolute difference is chosen as the representative motion vector.

When the determined minimum sum of absolute difference value from the previous step is greater than or equal to the motion estimation termination threshold, step 272 includes repeating the process described in steps 260, 270, and 273 for a predetermined number of times using next levels of equidistant motion vector values and the motion vector associated with the minimum sum of absolute difference as the initial motion vector.

When after repeating the above-described steps for the predetermined number of times, the determined minimum sum of absolute difference does not yield a value less than the motion estimation termination threshold, step 280 includes computing the motion vector based on the minimum sum of absolute difference value through full search algorithm, and further includes computing block variances of current and difference macroblocks. In some embodiments, the block variance of current and difference macro blocks are computed and compared using the following equations:

$$\sum_{I=0}^{255}(x_I-y_I)^2 < \sum_{I=0}^{255}(x_I-\mu)^2$$

Step 290 includes comparing the computed variance of the current macroblock with the computed variance of the difference macroblock. The current macroblock is then encoded by selecting inter or intra mode as shown in steps 275 and 295 based on the outcome of the comparison. In inter mode, the motion vector associated with the minimum sum of absolute difference from the global full search is chosen as the representative motion vector. Encoding using intra mode means encoding the current macroblock without using the motion vector estimation.

Figure 3:
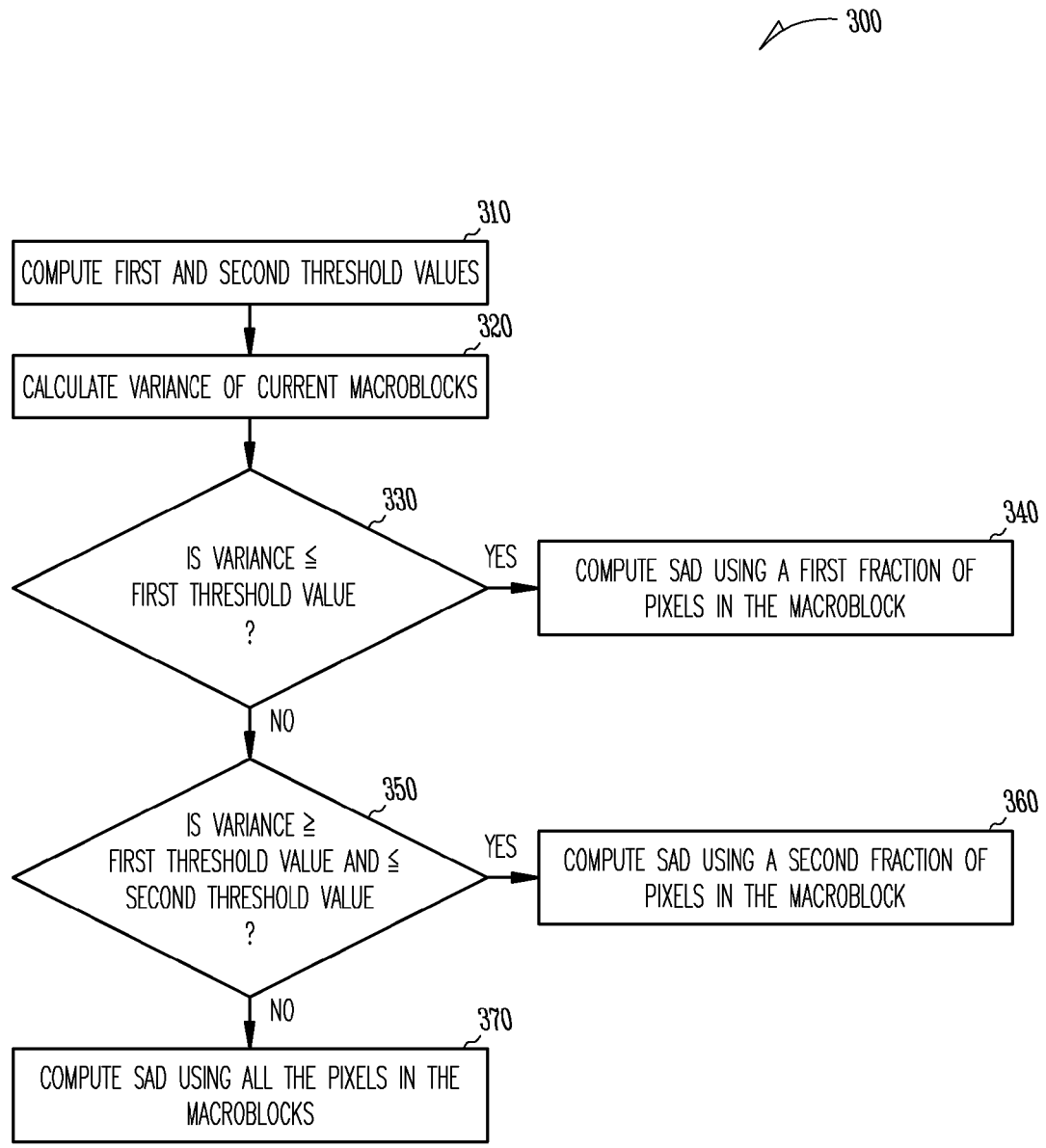
FIG. 3 is a flowchart illustrating the operation of another embodiment of the present invention.

FIG. 3 is a flowchart illustrating one example embodiment of a process 300 of computing the sum of absolute difference between the current and reference macroblocks to reduce the complexity of the above-described computationally intensive step 240. This is achieved by exploiting the knowledge of "average bit generation is proportional to variance." During initial distortion calculation, i.e., the sum of absolute difference calculation, a partial or full area of macroblocks are used depending on the original macroblock's variance. The process of computing the sum of absolute difference using the partial or full area of macroblocks is explained in more detail below using flowchart 300.

Flowchart 300 includes steps 310-370, which are arranged serially in the exemplary embodiment. However, other embodiments of the invention may execute two or more steps in parallel using multiple processors or a single processor organized as two or more virtual machines or subprocessors. Moreover, still other embodiments implement the steps as two or more specific interconnected hardware modules with related control and data signals communicated between and through the modules, or as portions of an application-specific integrated circuit. Thus, the exemplary process flow is applicable to software, firmware, and hardware implementations.

The process begins with step 310 by computing first and second threshold values. In some embodiments, the first and second threshold values are computed using the following equations:

$$\text{first threshold value} = (\alpha + \text{motionspeedflag})^2 * 256$$

$$\text{second threshold value} = (\beta + \text{motionspeedflag})^2 * 256$$

wherein $\alpha$ and $\beta$ are user-specified constants ($\alpha < \beta$) and motionspeedflag is a user specified integer value that controls the computational speed of the encoder.

Step 320 includes calculating the variance of the current macroblocks. In some embodiments, the variance of the current macroblocks are computed using the equation:

$$\text{variance} = S_2 - (S*S)/256$$

wherein $S_2$ is a sum of squares of all luminance components of the macroblock and S is a sum of all luminance components of the macroblock.

Step 330 includes comparing the computed variance of current macroblocks with the computed first threshold value. When the computed variance is less than or equal to the first threshold value, step 340 includes computing the sum of absolute difference using a first fraction of the number of pixels in the current and reference macroblocks. The computed sum of absolute difference is then multiplied by a first scale factor to obtain the sum of absolute difference for all the pixels in the macroblocks. In some embodiments, the first fraction of the number of pixels is 25% of the number of pixels in the current and reference macroblocks. In these embodiments, the first scale factor used to obtain the sum of absolute difference for all the pixels in the macroblocks is 4.

When computed variance of current macroblock is already greater than first threshold value, step 350 includes comparing the computed variance of current macroblocks with the computed second threshold value. When the computed variance is greater than or equal to the first threshold value and further the computed variance is less than or equal to the second threshold value, step 360 includes computing the sum of absolute difference using a second fraction of the number of pixels in the current and reference macroblocks. The computed sum of absolute difference is then multiplied by a second scale factor to obtain the sum of absolute difference for all the pixels in the macroblocks. In some embodiments, the second fraction of the number of pixels is 50% of the number of pixels in the current and reference macroblocks. In these embodiments, the second scale factor used to obtain the sum of absolute difference for all the pixels in the macroblocks is 2.

When the calculated variance of the current macroblocks is greater than the second threshold value, step 370 includes computing the sum of absolute difference using all of the pixels in the current and reference macroblocks. Methods 200 and 300 shown in FIGS. 2 and 3 may be implemented as a receive module 110, an analyzer 142, a comparator 144, a memory 146, a reconstruction module 150, an encoder controller 160, and a VLC encoder 170, as shown in FIG. 1. Various aspects of the present invention are implemented in software, which may be run in the environment shown in FIG. 4 or any other suitable computing environment. The present invention is operable in a number of other general purpose or special purpose computing environments. Some computing environments are personal computers, general-purpose computers, server computers, hand-held devices, laptop devices, multiprocessors, microprocessors, set top boxes, programmable consumer electronics, network PCs, minicomputers, mainframe computers, distributed computing environments and the like to execute computer-executable instructions for performing a frame-to-frame digital video encoding of the present invention, which is stored on a computer readable medium. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

Figure 4:
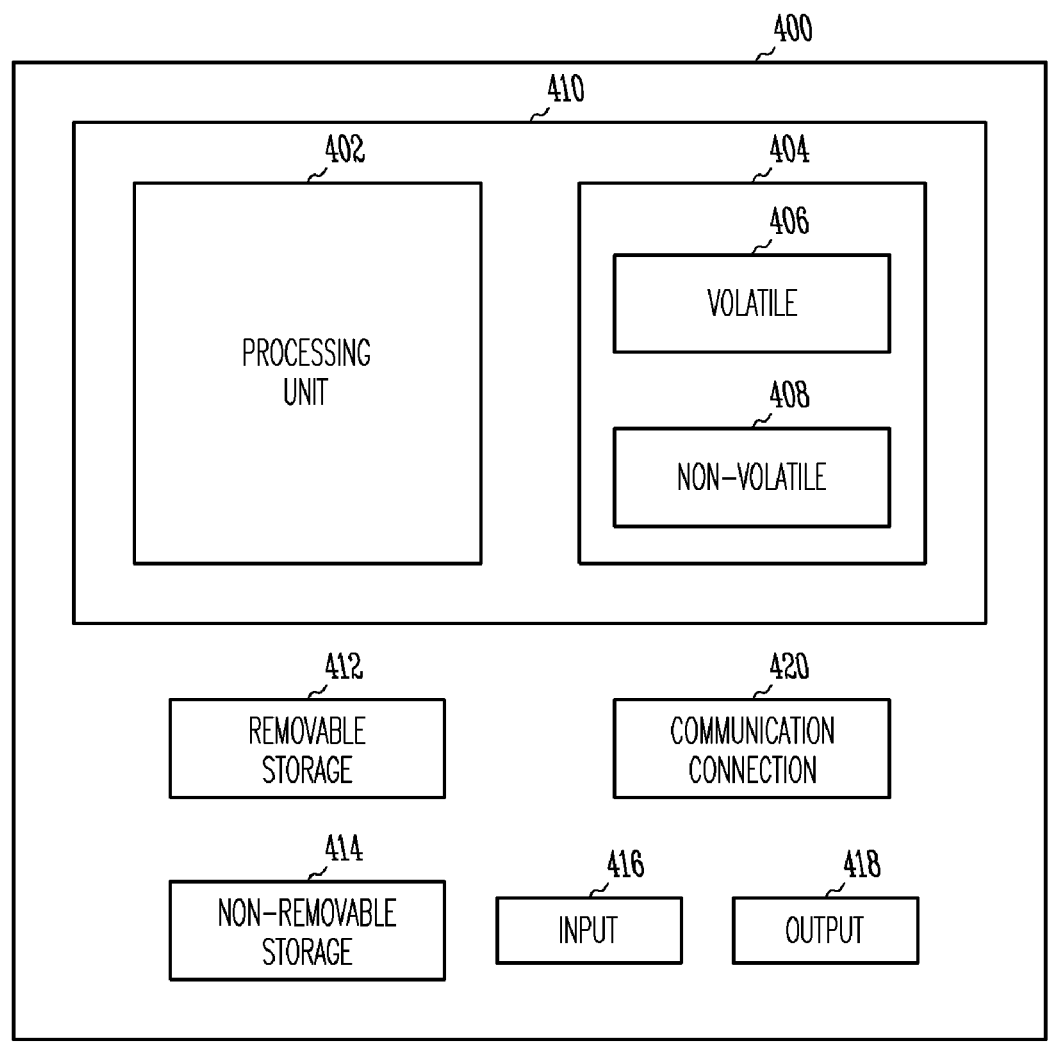
FIG. 4 is a block diagram of a suitable computing system environment for implementing embodiments of the present invention, such as those shown in FIGS. 1, 2, and 3.

FIG. 4 shows an example of a suitable computing system environment 400 for implementing embodiments of the present invention, such as those shown in FIGS. 1, 2, and 3. Various aspects of the present invention are implemented in software, which may be run in the environment shown in FIG. 4 or any other suitable computing environment. The present invention is operable in a number of other general purpose or special purpose computing environments. Some computing environments are personal computers, server computers, hand-held devices, laptop devices, multiprocessors, microprocessors, set top boxes, programmable consumer electronics, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

FIG. 4 shows a general computing device in the form of a computer 410, which may include a processing unit 402, memory 404, removable storage 412, and non-removable storage 414. The memory 404 may include volatile 406 and non-volatile memory 408. Computer 410 may include—or have access to a computing environment that includes—a variety of computer-readable media, such as volatile 406 and non-volatile memory 408, removable 412 and non-removable storage 414. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

Conclusion

The above-described invention provides an efficient digital video compression technique that enhances encoder performance without compromising on the quality of compression during motion estimation. Further the technique provides an alternative approach to global full search technique (FS) that can be implemented in real-time applications at a reasonable cost.

The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. A method, comprising:
using a computer processor for partitioning a current frame into non-overlapping macroblocks;
using a computer processor for computing a motion estimation termination threshold for a current macroblock using macroblock parameters:
using a computer processor for selecting an initial motion vector for the current macroblock using spatio-temporal neighboring macroblock parameters;
using a computer processor for determining an initial distortion for the current macroblock by computing a sum of absolute difference using the selected initial motion vector and an associated reference macroblock;
using a computer processor for comparing the computed initial distortion to the computed motion estimation termination threshold;
if the computed initial distortion is less than the computed motion estimation termination threshold, then selecting inter coding mode for encoding the current macroblock and choosing the selected initial motion vector as the representative, motion vector for the current macroblock;
if the computed initial distortion is greater than or equal to the computed motion estimation termination threshold, then computing the sum of absolute difference values at each equidistant motion vector position from the initial motion vector;
using a computer processor for determining a minimum sum of absolute difference value from the computed sum of absolute difference values; and
if the determined minimum sum of absolute difference value is less than the motion estimation termination threshold, then selecting inter coding mode for encoding the current macroblock and choosing the motion vector associated with the minimum sum of absolute difference as the representative motion vector.

2. The method of claim 1, wherein intra coding comprises:
using the computer processor for coding the current macroblock without using the motion vector information.

3. The method of claim 2, wherein inter coding comprises:
using the computer processor for coding the current macroblock by using the computed motion vector information of the current macroblock, along with QDCT elements.

4. The method of claim 1, further comprising:
using the computer processor for repeating the above steps for the next current macroblock in the current frame.

5. The method of claim 1, wherein the macroblocks are based on square blocks of luminance components of the 16×16 pixels in size.

6. The method of claim 1, wherein selecting the initial motion vector for the current macroblock using spatio-temporal neighboring macroblock parameters further comprises:
using the computer processor for adopting a predefined voting technique to select the initial motion vector from spatio-temporal neighboring macroblock's motion vectors.

7. The method of claim 1, comprising comparing the determined sum of absolute difference values to the motion estimation termination threshold, which further comprises:
if the determined minimum sum of absolute difference value is less than the motion estimation termination threshold, then using the computer processor for selecting the inter coding mode for encoding the current macroblock and choosing the motion vector associated with the minimum sum of absolute difference as the representative motion vector;
if the determined minimum sum of absolute difference value is greater than or equal to the motion estimation termination threshold, then using the computer processor for repeating the above steps for a predetermined number of times using the motion vector associated with the minimum sum of absolute difference as the initial motion vector;
if after repeating the above steps for the predetermined number of times, the determined minimum sum of absolute difference value does not yield a value less than the motion estimation termination threshold, then using the computer processor for doing a global full search to determine the motion vector based on the lowest sum of absolute difference value obtained;
using the computer processor for computing a block variance of the current macroblock and a block variance of a difference macroblock;
using the computer processor for comparing the computed variance of the current macroblock value with the computed variance of the difference macroblock value; and
using the computer processor for selecting inter or intra coding for encoding the current macroblock and choosing the motion vector associated with the minimum sum of absolute difference from full search as the representative motion vector based on the outcome of the comparison.

8. The method of claim 7, wherein selecting the initial motion vector for the current macroblock using spatio-temporal neighboring macroblock parameters further comprises:
using the computer processor for selecting candidate spatio-temporal neighboring macroblocks having a computed motion vector; and
using the computer processor for selecting the initial motion vector for the current macroblock from selected candidate macroblocks based on a predetermined voting technique.

9. The method of claim 7, wherein computing the motion estimation termination threshold for the current macroblock in the current frame using macroblock parameters comprises:

using the computer processor for computing the motion estimation termination threshold for the current macroblock using the equation:

$$sqrt\left(\sum_{I=0}^{255}(x_I-\mu)^2+2*255*128*(x_{avg})^2\right)$$

wherein $x_I$'s are luminance components of the current macroblock, $x_{avg}$ is the allowed average absolute pixel-difference for an optimal prediction, and $\mu$ is the mean of $x_I$ where I=0 to 255.

10. The method of claim 9, wherein computing the sum of absolute difference between the current and reference macroblocks is based on using the equation:

$$\sum_{I=0}^{255}|x_I-y_I|$$

wherein $x_I$'s are luminance components of the current macroblock and $y_I$'s are luminance components of the reference macroblock.

11. The method of claim 9, wherein computing the sum of absolute difference values with the equidistant motion vector position from the initial motion vector comprises:
   if the initial motion vector is (u, v), then using the computer processor for computing the sum of absolute difference values for equidistant positions at {(u−1,v−1), (u−1, v), (u−1, v+1), (u, v−1), (u, v+1), (u+1, v−1), (u+1, v), (u+1, v+1)}.

12. The method of claim 9, wherein comparing the block variance of the current macroblock with the block variance of the difference macroblock is based on using the equations:

$$\sum_{I=0}^{255}(x_I-y_I)^2<\sum_{I=0}^{255}(x_I-\mu)^2.$$

13. A computer readable storage device encoded with computer executable instructions for executing a method, comprising:
   partitioning a current frame into non-overlapping macroblocks;
   computing a motion estimation termination threshold for a current macroblock using macroblock parameters;
   selecting an initial motion vector for the current macroblock using spatio-temporal neighboring macroblock parameters;
   determining an initial distortion for the current macroblock by computing a sum of absolute difference using the selected initial motion vector and an associated reference macroblock;
   comparing the computed initial distortion to the computed motion estimation termination threshold;
   if the computed initial distortion is less than the computed motion estimation termination threshold, then selecting inter coding mode for encoding the current macroblock and choosing the selected initial motion vector as the representative motion vector for the current macroblock;
   if the computed initial distortion is greater than or equal to the computed motion estimation termination threshold, then computing the sum of absolute difference values at each of the equidistant motion vector positions from the initial motion vector;
   determining a minimum sum of absolute difference value from the computed sum of absolute difference values; and
   if the determined minimum sum of absolute difference value is less than the motion estimation termination threshold, then selecting inter coding mode for encoding the current macroblock and choosing the motion vector associated with the minimum sum of absolute difference as the representative motion vector.

14. The computer readable storage device of claim 13, wherein intra coding comprises:
   coding the current macroblock without using the motion vector information.

15. The computer readable storage device of claim 14, wherein inter coding comprises:
   coding the current macroblock by using the computed motion vector information of the current macroblock, along with QDCT elements.

16. The computer readable storage device of claim 13, further comprising:
   repeating the above steps for the next current macroblock in the current frame.

17. The computer readable storage device of claim 13, wherein the macroblocks are based on square blocks of luminance components of 16×16 pixels in size.

18. The computer readable storage device of claim 13, wherein selecting the initial motion vector for the current macroblock using spatio-temporal neighboring macroblock parameters further comprises:
   adopting a predefined voting technique to select the initial motion vector from spatio-temporal neighboring macroblock's motion vectors.

19. A computer system, comprising:
   a processor;
   an output device; and
   a storage device to store computer executable instructions that are executable by the processor to perform a method comprising:
      partitioning a current frame into non-overlapping macroblocks;
      computing a motion estimation termination threshold for a current macroblock using macroblock parameters;
      selecting an initial motion vector for the current macroblock using spatio-temporal neighboring macroblock parameters;
      determining an initial distortion for the current macroblock by computing a sum of absolute difference using the selected initial motion vector and an associated reference macroblock;
      comparing the computed initial distortion to the computed motion estimation termination threshold;
      if the computed initial distortion is less than the computed motion estimation termination threshold, then selecting inter coding mode for encoding the current macroblock and choosing the selected initial motion vector as the representative motion vector for the current macroblock;
      if the computed initial distortion is greater than or equal to the computed motion estimation termination threshold, then computing the sum of absolute difference values at each equidistant motion vector position from the initial motion vector;
      determining a minimum sum of absolute difference value from the computed sum of absolute difference values; and
      if the determined minimum sum of absolute difference value is less than the motion estimation termination threshold, then selecting inter coding mode for encoding the current macroblock and choosing the motion vector associated with the minimum sum of absolute difference as the representative motion vector.

20. The computer system of claim 19, wherein intra coding comprises:
coding the current macroblock without using the motion vector information.

21. The computer system of claim 20, wherein inter coding comprises:
coding the current macroblock by using the computed motion vector information of the current macroblock, along with QDCT elements.

22. The computer system of claim 19, further comprising:
repeating the above steps for the next current macroblock in the current frame.

23. The computer system of claim 19, wherein the macroblocks are based on square blocks of luminance components of 16×16 pixels in size.

24. The computer system of claim 19, wherein selecting the initial motion vector for the current macroblock using spatio-temporal neighboring macroblock parameters further comprises:
adopting a predefined voting technique to select the initial motion vector from spatio-temporal neighboring macroblock's motion vectors.

* * * * *